Dec. 23, 1930.                O. CULLMAN                1,786,192
                        SUPPORT FOR ELECTRIC MOTORS
                            Filed Oct. 15, 1928

Inventor:
Otto Cullman
By: Charles Turner Brown,
    Atty.

Patented Dec. 23, 1930

1,786,192

UNITED STATES PATENT OFFICE

OTTO CULLMAN, OF CHICAGO, ILLINOIS

SUPPORT FOR ELECTRIC MOTORS

Application filed October 15, 1928. Serial No. 312,569.

This invention relates to means to adjustably mount electric motors to run a determined machine.

Among the objects of the invention is to obtain means to accurately and easily adjust a high speed electric motor so that the driven shaft thereof will be in alignment with and a suitable distance from the shaft driven by said motor. A further object is to obtain a motor support which may be easily attached to the base or housing of driven mechanism, and the motor speedily adjusted.

Figure 1:
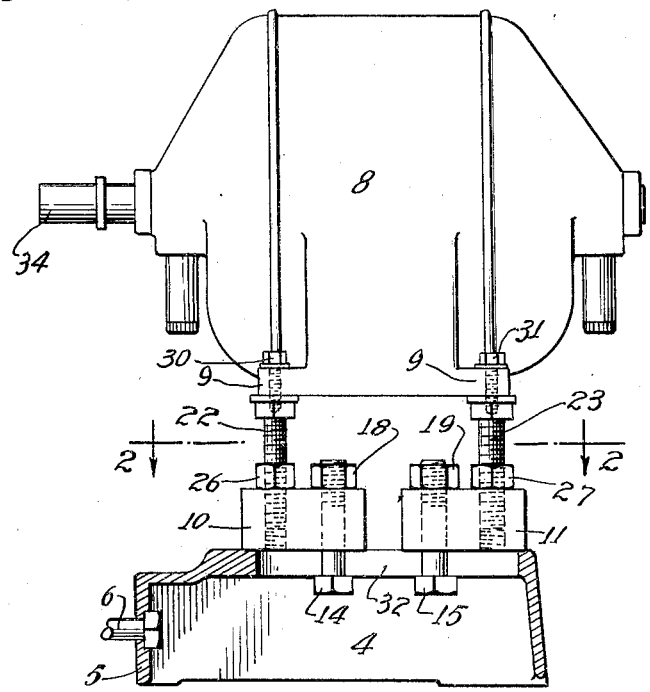
Figure 2:
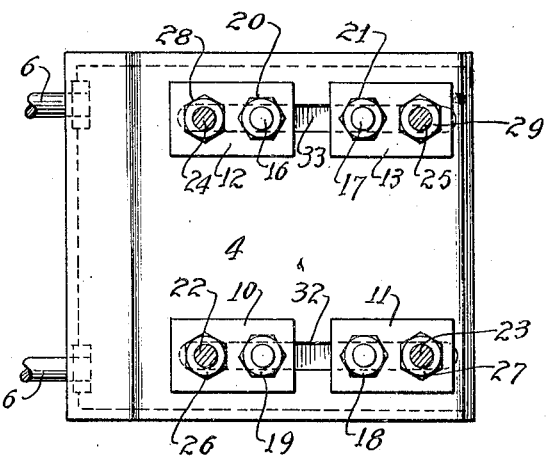

I have illustrated a support for electric motors embodying the invention in the drawing referred to, in which Fig. 1 is a side elevation of an electric motor mounted on a base, said base being shown in vertical section, Fig. 2 is a horizontal section on line 2—2 of Fig. 1, viewed as indicated by arrows; showing a top plan view of the base on which the motor is mounted and of adjusting means on said base.

A reference character applied to designate a given part indicates said part throughout the several figures of the drawing wherever the same appears.

4 represents the base on which a motor is mounted in a manner hereinafter described. 5, represents one end of base 4, and 6, 7, a bolt and nut by means of which end 5 is rigidly secured to the housing of driven mechanism. 8 represents the casing of an electric motor, and 9 base members of said casing. 10, 11, 12, and 13, respectively represent adjusting blocks which are mounted on the upper face of the table of base 4. 14, 15, 16 and 17 represent bolts and 18, 19, 20 and 21 represent nuts on said bolts. When blocks 10, 11, 12 and 13 are adjusted on the base 4 they are, respectively secured rigidly in place by said bolts and nuts. 22, 23, 24 and 25, respectively represent screw threaded bolts which are adjustably fitted in corresponding internal screw threaded apertures in blocks 10, 11, 12 and 13. 26, 27, 28 and 29 respectively, represent nuts on bolts 22, 23, 24 and 25, by means of which said bolts are rigidly held in adjusted positions relative to said blocks 10, 11, 12 and 13. 30, 31, (Fig. 1), represent screw threaded bolts which extend through apertures therefor in base members 9 of motor casing 8 into corresponding screw threaded apertures or holes in the upper ends of bolts 22, 23, 24 and 25, to hold the motor casing 8 rigidly in position on said bolts. 32, 33 represent slots in the table of base 4. 34 represents the driven shaft of an electric motor.

Base 4 being rigidly secured to a housing by bolts 6 and nuts 7, with motor casing 8 loosely mounted on the upper ends of bolts 22, 23, 24 and 25, and with shaft 34 of the motor in the housing, suitable lateral adjustment of the motor is obtained by turning blocks 10, 11, 12 and 13 pivotally on bolts 14, 15, 16 and 17, and when necessary, sliding said bolts in grooves 32, 33. The blocks are then rigidly secured in adjusted position by nuts 18, 19, 20 and 21.

Bolts 30, 31 being loosely mounted in the base members 9 of the motor casing 8, and in the screw threaded holes in the upper ends of the bolts 22, 23, 24 and 25, vertical adjustment of the motor and shaft 34 is obtained by turning the said bolts in blocks 10, 11, 12 and 13; and after the vertical adjustment is obtained said bolts are rigidly secured in adjusted position by nuts 26, 27, 28 and 29. Bolts 30, 31, and duplicate ones on the opposite side of the motor casing, (not shown), are tightened to place to hold the motor casing (8) rigidly in place on the bolts 22, 23, 24 and 25.

The above described lateral adjustment is made to place shaft 34 in alignment with a sprocket and its shaft; and the vertical adjustment described is to obtain suitable tension on a sprocket chain (not shown). As the chain stretches by use the vertical adjustment may be repeated whenever desirable.

I claim:

In a support for electric motors, a base having a table thereto and said table provided with slots, blocks on said table and bolts extending through said slots and blocks, nuts on said bolts, in combination with bolts extending into corresponding screw threaded holes in said blocks, nuts on said last named bolts, a motor casing mounted on the upper ends of said last named bolts, and additional bolts extending through apertures in the foot members of said motor casing and into corresponding screw threaded holes in the upper ends of said last named bolts.

OTTO CULLMAN.